United States Patent
Duan et al.

(10) Patent No.: US 11,549,823 B2
(45) Date of Patent: Jan. 10, 2023

(54) COMPACT 3-AXIS COIL DESIGN FOR MAGNETIC TRACKING

(71) Applicant: Apple Inc., Cupertino, CA (US)

(72) Inventors: Guangwu Duan, Cupertino, CA (US); Jian Guo, Milpitas, CA (US); John Greer Elias, Townsend, DE (US); Savas Gider, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,122

(22) Filed: Sep. 23, 2021

(65) Prior Publication Data

US 2022/0090942 A1 Mar. 24, 2022

Related U.S. Application Data

(60) Provisional application No. 63/082,415, filed on Sep. 23, 2020.

(51) Int. Cl.
*G01D 5/20* (2006.01)
*H01F 7/20* (2006.01)

(52) U.S. Cl.
CPC ............. *G01D 5/2006* (2013.01); *H01F 7/20* (2013.01)

(58) Field of Classification Search
CPC .... G01D 5/12; G01D 5/14; G01D 5/20–2291; H01F 7/06; H01F 7/20
See application file for complete search history.

(56) References Cited

U.S. PATENT DOCUMENTS

| | | | |
|---|---|---|---|
| 8,450,997 B2 | 5/2013 | Silverman | |
| 8,907,667 B2* | 12/2014 | Klein | H01F 7/20 324/253 |
| 10,534,454 B2 | 1/2020 | Stafford et al. | |
| 2015/0243425 A1* | 8/2015 | Martel | A61P 35/00 361/147 |
| 2018/0321333 A1* | 11/2018 | Cochrane | G01R 33/0206 |
| 2018/0340804 A1 | 11/2018 | Cherkashin | |

* cited by examiner

*Primary Examiner* — Huy Q Phan
*Assistant Examiner* — David B Frederiksen
(74) *Attorney, Agent, or Firm* — Fish & Richardson P.C.

(57) ABSTRACT

Disclosed is a compact 3-axis coil design for a magnetic tracking system. In an embodiment, compactness is achieved by using a 3-axis coil in the transmitter that includes a scaffold design with a side surface having a curved groove for guiding one or more windings of a z-axis coil, such that the physical geometry is not increased.

7 Claims, 3 Drawing Sheets

COMPACT 3-AXIS COIL DESIGN FOR MAGNETIC TRACKING

CROSS-REFERENCE TO RELATED APPLICATION

This application claims priority to U.S. Provisional Patent Application No. 63/082,415, filed Sep. 23, 2020, the entire contents of which are incorporated herein by reference.

TECHNICAL FIELD

This disclosure relates to 3-axis coils for magnetic tracking systems.

BACKGROUND

Magnetic tracking systems are used to track the position of a moving target. Existing magnetic tracking systems include a base station or "transmitter" that generates alternating or static electromagnetic fields (hereinafter "magnetic fields") that cover a three dimensional (3D) space. The magnetic fields are typically emitted by three coils that are arranged perpendicular to each other, referred to as a "3-axis coil." The 3-axis coil is placed in a housing mounted on the transmitter, which can be fixed or moving. A target (a receiver) in the proximity of the transmitter may also include a 3-axis coil that senses the change in the magnetic fields as the target moves and computes the position of the target based on the change. The conventional 3-axis coil design used in existing magnetic tracking systems has a physical geometry that makes the design unsuitable for certain applications that require housings with thin or flat form factors, and/or relies on inertial sensors and magnetometers to assist in tracking the target in the 3D space

SUMMARY

Disclosed is a compact 3-axis coil design for a magnetic tracking system. In an embodiment, compactness is achieved by using a 3-axis coil design in a transmitter or target (receiver) that includes a disc-shaped scaffold with top, bottom and side surfaces, where the top and bottom surfaces have grooves for x and y bar coils, respectively, and the side surface has a curved groove for guiding one or more windings of the z-axis coil, such that the z coil magnetic field component does not interfere with the magnetic field components of the x bar coil or y bar coil. The resulting physical geometry of the 3-axis coil is suitable for applications with housings that have thin or flat form factors, or for low cost systems and devices that may not have inertial sensors or magnetometers.

Particular implementations of the disclosed compact 3-axis coil design have the following advantages. Host devices for the compact 3-axis coil design can have thin or flat form factors, such as smart phones, tablet computers and wearable devices (e.g., smart watches, earbuds, headsets). Additionally, the disclosed compact 3-axis coil design allows for accurate 3-axis tracking of targets in a 3D tracking space without relying on inertial sensors and/or magnetometers in the host device, thus allowing the use of the compact 3-axis coil design in low cost or less complex systems and devices (e.g., smart speakers, earbuds, virtual reality headsets).

Other embodiments are directed to systems, method, apparatuses and non-transitory, computer-readable mediums.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
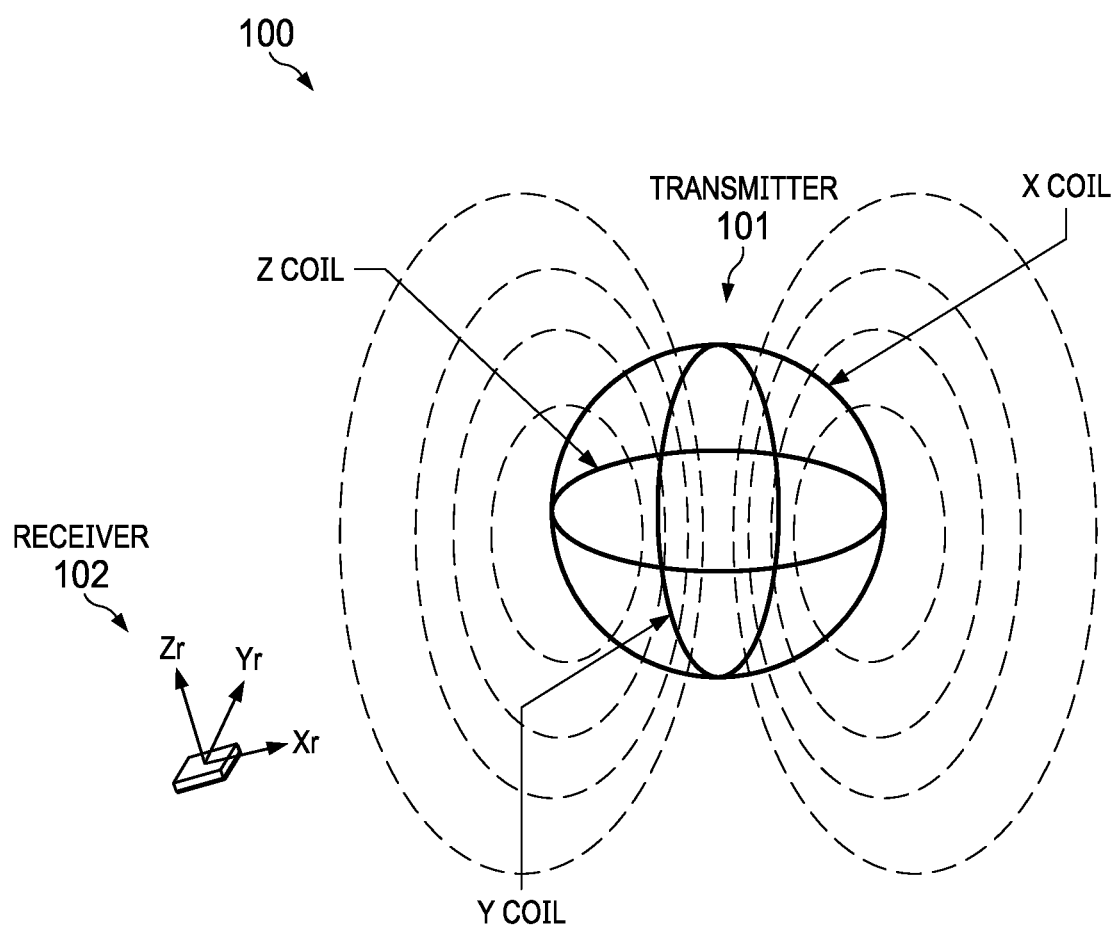
FIG. 1 illustrates a conventional magnetic tracking system with a 3-axis coil on both receiver and transmitter sides.

FIG. 1 illustrates magnetic tracking system 100 that includes a transmitter 101 (Tx) which can be any device that has a conventional 3-axis coil, and receiver 102 (Rx) for sensing magnetic fields generated by transmitter 101. In this embodiment and subsequent embodiments described herein, transmitter 101 is stationary and receiver 102 (hereinafter also referred to as "target") is tracked by transmitter 101. Receiver 102 can include any device that has a 3-axis magnetometer (e.g., coils, Hall sensors, magneto-resistive (MR) sensors). The position (x, y, z) of receiver 102 is calculated from the sensed magnetic fields using techniques known in the art. The implementation of the 3-axis coil in transmitter 101 requires significant engineering effort to ensure coil alignment, coil balance and calibration. More importantly, the 3-axis coil transmitter design may not be an option in applications that require a housing with a thin or flat form factor due to the additional height needed to accommodate the z-axis coil.

Example Compact 3-Axis Coil Design

Figure 2A:
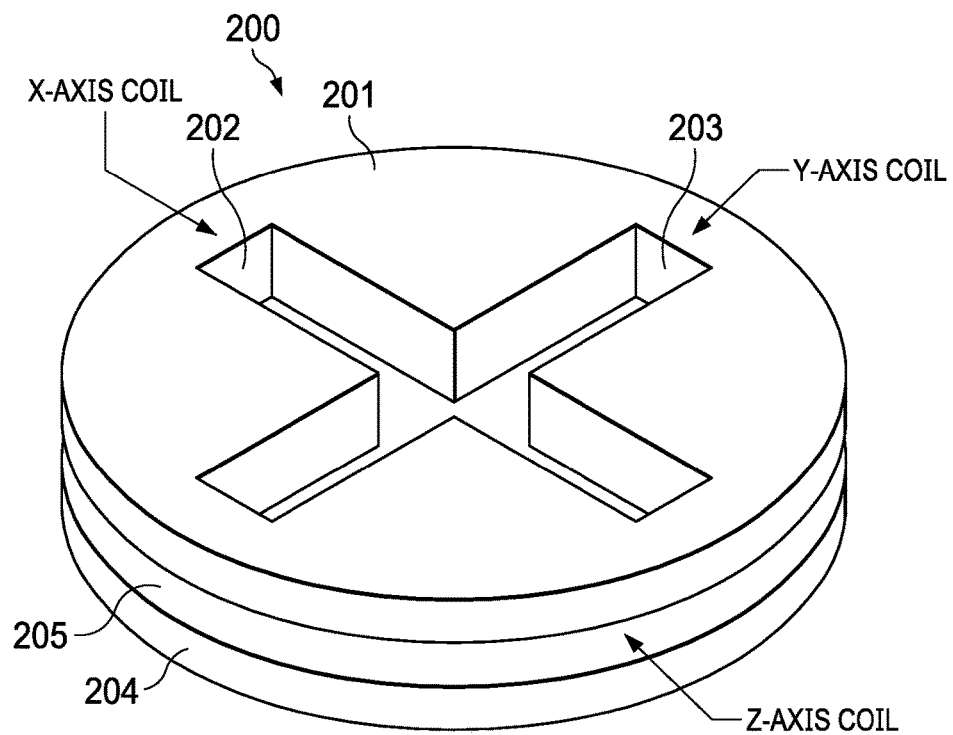
FIG. 2A illustrates a conventional 3-axis coil scaffold.

FIG. 2A illustrates a conventional disc-shaped scaffold 200 for a 3-axis coil design. In an embodiment, x and y bar coils (not shown) are disposed inside grooves 202, 203, respectively, on top surface 201 of scaffold 200. The z coil is wrapped in linear groove 205 around side surface 204 of scaffold 200. Due to groove 205 on side surface 204 for the z coil, the diameter of scaffold 200 must be longer than the length of the x and y bar coils, resulting in an increase in the physical geometry of the 3-axis coil to accommodate the z-axis coil.

Figure 2B:
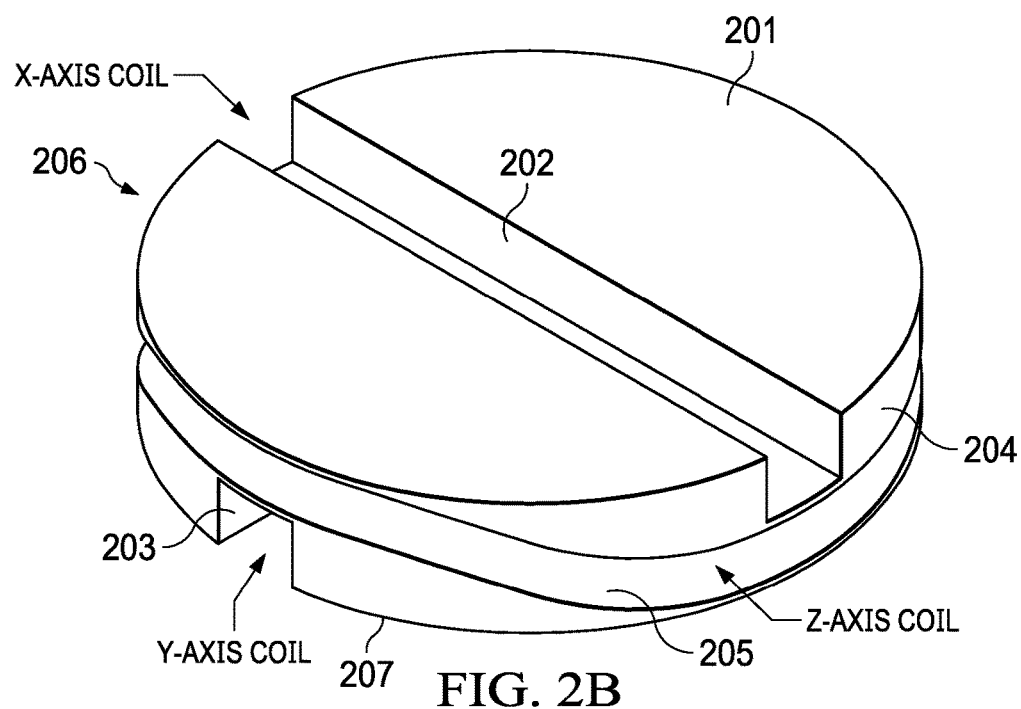
FIG. 2B illustrates a compact 3-axis coil scaffold, according to an embodiment.

FIG. 2B illustrates an improved scaffold 206 for a compact 3-axis coil without increasing the physical geometry of the 3-axis coil, according to an embodiment. The x bar coil and y bar coil (not shown) are disposed inside groves 202, 203, respectively, on top and bottom surfaces 201, 207, respectively. Grooves 202, 203 extend to be flushed with the side surface 204. The z coil is wrapped in curved groove 205 around side surface 204. Note that curved groove 205 guides the z-coil windings so as to avoid crossing over the openings of grooves 202, 203 at the side surface (guided over and underneath the openings). Due to curved groove 205, the diameter of scaffold 206 is the same size as the length of the x bar coil and the y bar coil. The outline of scaffold 206 can be generalized to any geometry.

Example Host Device Architecture

Figure 3:
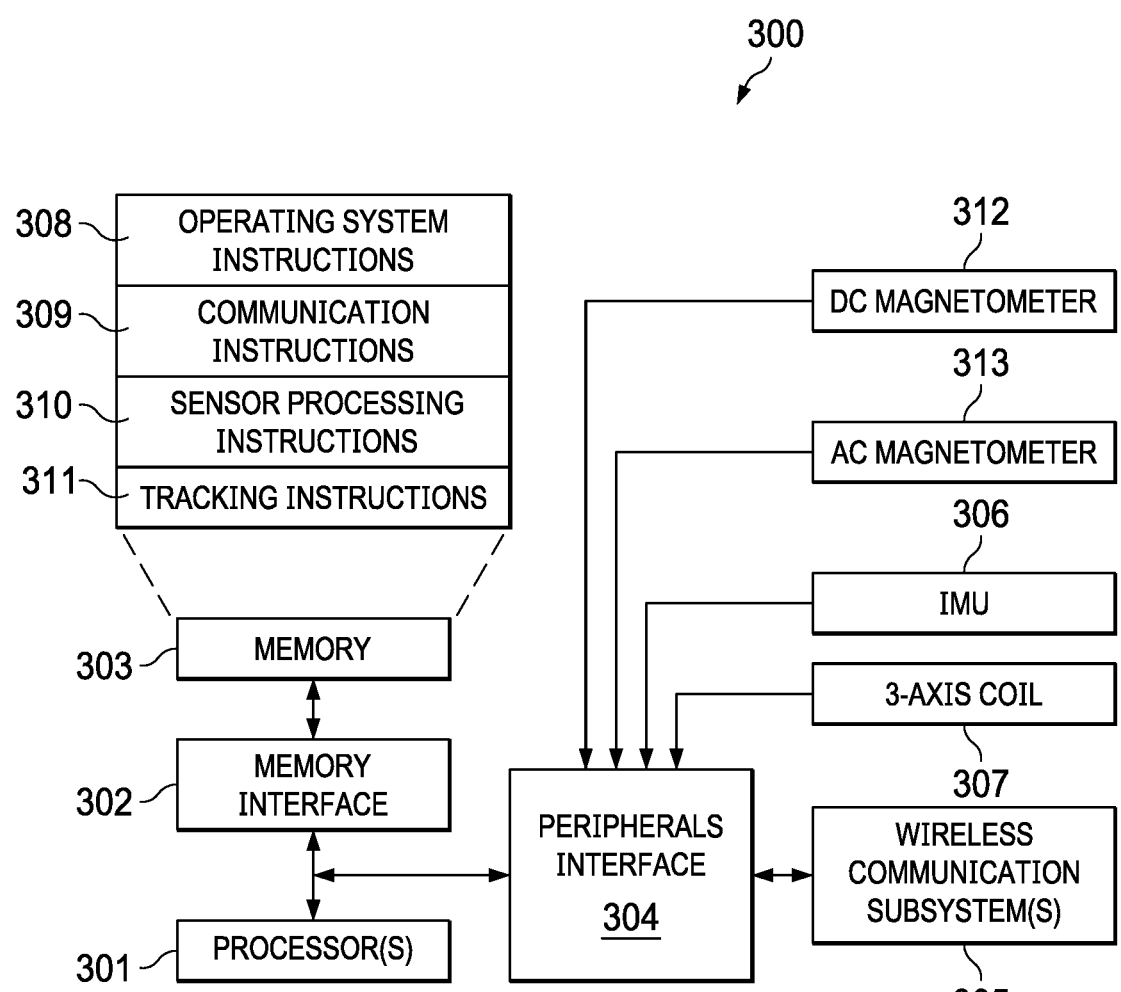
FIG. 3 illustrates a device architecture for the transmitter or receiver for the multi-user magnetic tracking system, described in reference to FIGS. 1-2, according to an embodiment.

FIG. 3 illustrates a host device architecture for a transmitter or target/receiver, as described in reference to FIGS. 1-2, according to an embodiment. Architecture 300 can be implemented in any desired system or product, including but not limited to a smart phone, tablet computer, smartwatch, smart glasses, earbuds, headsets or a smart pencil. Architecture 300 can include memory interface 302, one or more data processors, video processors, co-processors, image processors and/or other processors 301, and peripherals interface 304. Memory interface 302, one or more processors 301 and/or peripherals interface 304 can be separate components or can be integrated in one or more integrated circuits. The various components in architecture 300 can be coupled by one or more communication buses or signal lines.

Sensors, devices and subsystems can be coupled to peripherals interface 304 to facilitate multiple functionalities. In this example architecture 300, IMU 306, DC magnetometer 312, AC magnetometer 313 and 3-axis coil 307 are connected to peripherals interface 304 to provide data that can be used to determine a change in magnetic field gradient as a function of time and distance, as previously described in reference to FIGS. 1-2. An example 3-axis coil is the compact 3-axis coil design described in reference to FIG. 2B. IMU 306 can include one or more accelerometers and/or angular rate sensors (e.g. gyro sensors) configured to determine the change of speed and direction of movement of the device. Peripheral interface 304 also includes a current driver coupled to 3-axis coil 307 for driving current into 3-axis coil 307.

Communication functions can be facilitated through one or more wireless communication subsystems 305, which can include radio frequency (RF) receivers and transmitters (or transceivers) and/or optical (e.g., infrared) receivers and transmitters. The specific design and implementation of the communication subsystem 305 can depend on the communication network(s) over which a mobile device is intended to operate. For example, architecture 300 can include communication subsystems 305 designed to operate over a GSM network, a GPRS network, an EDGE network, a Wi-Fi™ or Wi-Max™ network or a Bluetooth™ network.

Memory interface 302 can be coupled to memory 303. Memory 303 can include high-speed random access memory and/or non-volatile memory, such as one or more magnetic disk storage devices, one or more optical storage devices and/or flash memory (e.g., NAND, NOR). Memory 303 can store operating system 308, such as iOS, Darwin, RTXC, LINUX, UNIX, OS X, WINDOWS, or an embedded operating system such as VxWorks. Operating system 308 may include instructions for handling basic system services and for performing hardware dependent tasks. In some implementations, operating system 308 can include a kernel (e.g., UNIX kernel).

Memory 303 stores communication instructions 309 to facilitate communicating with one or more additional devices via a wireless ad hoc network (e.g., a Bluetooth piconet) or other communication medium, one or more computers and/or one or more servers, such as, for example, instructions for implementing a software stack for wired or wireless communications with other devices. Memory 303 stores sensor processing instructions 310 to facilitate sensor-related processing and functions, such as processing output from 3-axis coil 307. Memory 303 stores tracking instructions 311. Memory also stores instructions for one or more applications that use the position tracking described in reference to FIGS. 1-2, such as augmented reality (AR) or virtual reality (VR) applications.

Each of the above identified instructions and applications can correspond to a set of instructions for performing one or more functions described above. These instructions need not be implemented as separate software programs, procedures, or modules. Memory 303 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A three-axis coil comprising:
    a scaffold having a top surface, a bottom surface and a side surface;
    a first groove in the top surface and extending to the side surface;
    an first bar coil disposed in the first groove and configured to emit a first magnetic field component in a first direction when excited by a current;
    a second groove in the bottom surface and extending to the side surface;
    an second bar coil disposed in the second groove and configured to emit a second magnetic field component in a second direction that is perpendicular to the first direction when excited by the current;
    a curved groove in the side surface; and
    one or more windings of a coil disposed in the curved groove and configured to emit a third magnetic field component in a third direction in a space that is perpendicular to the first direction and the second direction when excited by the current, the curved groove shaped to guide the windings along the side surface and underneath or over openings of the first groove and the second groove at the side surface.

2. The three-axis coil of claim 1, wherein the scaffold is disc-shaped.

3. A transmitter of a magnetic tracking system, the transmitter comprising:
    a three-axis coil including:
        a scaffold having a top surface, a bottom surface and a side surface;
        a first groove in the top surface and extending to the side surface;
        an first bar coil disposed in the first groove and configured to emit a first magnetic field component in a first direction when excited by a current;
        a second groove in the bottom surface and extending to the side surface;
        an second bar coil disposed in the second groove and configured to emit a second magnetic field component in a second direction that is perpendicular to the first direction when excited by the current;
        a curved groove in the side surface;
        one or more windings of a coil disposed in the curved groove and configured to emit a third magnetic field component in a third direction in a space that is perpendicular to the first direction and the second direction when excited by the current, the curved groove shaped to guide the windings along the side surface and underneath or over openings of the first groove and the second groove at the side surface; and
    a current driver coupled to the three-axis coil and configured to provide the current to the three-axis coil to cause the three-axis coil to emit an alternating current (AC) magnetic field into a three-dimensional (3D) space.

4. The transmitter of claim 3, further comprising:
    a wireless receiver configured to receive positions and attitudes from one or more targets in the 3D space; and
    one or more processors configured to track the positions and attitudes of the one or more targets in the 3D space.

5. The transmitter of claim 3, wherein the scaffold is disc-shaped.

6. A receiver of a magnetic tracking system, the receiver comprising:
    a three-axis coil including:
        a scaffold having a top surface, a bottom surface and a side surface;
        a first groove in the top surface and extending to the side surface;
        an first bar coil disposed in the first groove and configured to receive a first magnetic field component in a first direction;
        a second groove in the bottom surface and extending to the side surface;
        an second bar coil disposed in the second groove and configured to receive a second magnetic field component in a second direction that is perpendicular to the first direction;
        a curved groove in the side surface;
        one or more windings of a coil disposed in the curved groove and configured to emit a third magnetic field component in a third direction in a space that is perpendicular to the first direction and the second direction, the curved groove shaped to guide the windings along the side surface and underneath or over openings of the first groove and the second groove at the side surface; and
    one or more processors configured to convert the first, second and third magnetic field components into a position of the receiver in a three-dimensional (3D) space.

7. The receiver of claim 6, wherein the scaffold is disc-shaped.

* * * * *